(12) United States Patent
Labinski et al.

(10) Patent No.: US 6,953,070 B1
(45) Date of Patent: Oct. 11, 2005

(54) DISPENSER VALVE WITH PUSH-TO-OPEN SPOUT

(75) Inventors: Jeffery J. Labinski, Lakewood, OH (US); Michael H. Meyer, Sagamore Hills, OH (US); Louis J. Castro, Chesterland, OH (US); Raymond P. Kawolics, Solon, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 10/808,784

(22) Filed: Mar. 25, 2004

Related U.S. Application Data (60) Provisional application No. 60/457,511, filed on Mar. 25, 2003.

(51) Int. Cl.[7] .................................................. B65B 1/04
(52) U.S. Cl. ................. 141/351; 141/301; 137/614.03; 251/149.6
(58) Field of Search ............................... 141/301, 302, 141/351–354, 286, 290, 291; 137/614, 614.03; 251/149, 149.6

(56) References Cited

U.S. PATENT DOCUMENTS

| | | |
|---|---|---|
| 2,505,093 A | 4/1950 | Brock |
| 3,416,567 A | 12/1968 | Von Dardel et al. |
| 3,550,626 A | 12/1970 | Daniels et al. |
| 3,606,096 A | 9/1971 | Campbell |
| 3,994,324 A | 11/1976 | Zeyra |
| 4,146,018 A | 3/1979 | Aldridge et al. |
| 4,421,146 A | 12/1983 | Bond et al. |
| 4,445,551 A | 5/1984 | Bond et al. |
| 4,564,132 A | 1/1986 | Lloyd-Davies |
| RE32,354 E | 2/1987 | Savage |
| 4,770,391 A | 9/1988 | Sagger |
| 4,948,014 A | 8/1990 | Rutter et al. |
| 4,982,881 A * | 1/1991 | Amrein ...................... 222/514 |
| 5,031,662 A | 7/1991 | Roethel |
| 5,255,713 A | 10/1993 | Scholle et al. |
| 5,477,883 A | 12/1995 | Totten |
| 5,775,671 A | 7/1998 | Cote, Sr. |
| 6,138,878 A | 10/2000 | Savage et al. |
| 6,347,785 B1 | 2/2002 | Copp et al. |
| 6,397,902 B1 * | 6/2002 | Murphy ....................... 141/59 |
| 6,435,380 B1 * | 8/2002 | Raboin ....................... 222/484 |
| 6,779,556 B2 | 8/2004 | Roethel |

* cited by examiner

*Primary Examiner*—Steven O. Douglas
(74) *Attorney, Agent, or Firm*—Fay, Sharpe, Fagan, Minnich & McKee, LLP

(57) ABSTRACT

A dispensing valve comprises a first component comprising a body adapted to be secured in fluid communication to a fitment of a liquid container. The body defines a first flow passage that extends therethrough. The first flow passage has an inlet. A valve assembly is connected to said body. The valve assembly comprises: (i) a seal retaining body defining a second flow passage that communicates with said inlet of said first flow passage; and, (ii) a resilient seal member located in said second flow passage and resiliently urged into sealing engagement with the inlet to block fluid flow from the second flow passage into the first flow passage via the inlet. The dispensing valve further comprises an outlet spout that defines a bore that extends from and through a first end to and through a second end. The first end of the spout is slidably coupled to the first component, and the spout is selectively moveable slidably inward toward the first component to a position where the seal member is moved resiliently away from the inlet to allow fluid flow from the second flow passage to the first flow passage through the inlet. The spout can comprise a vent structure to facilitate escape of air from the receptacle container with which it is mated. A container including the dispensing valve is also disclosed.

11 Claims, 7 Drawing Sheets

DISPENSER VALVE WITH PUSH-TO-OPEN SPOUT

CROSS-REFERENCE TO RELATED APPLICATION

This application claims benefit of the filing date of and priority from U.S. provisional application Ser. No. 60/457,511 filed Mar. 25, 2003.

BACKGROUND

Figure 1:
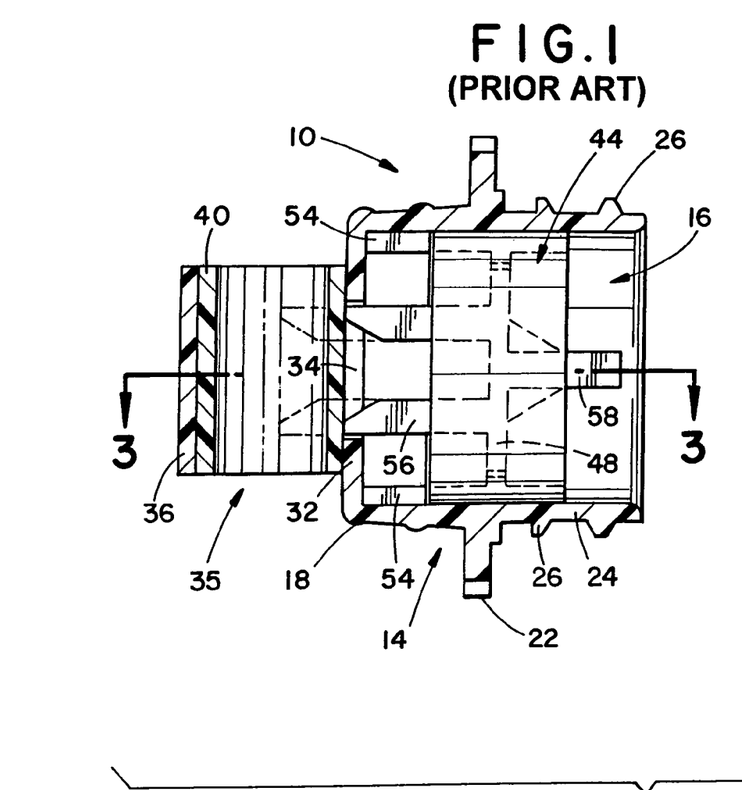
FIG. 1 is a longitudinal cross-sectional view of known (prior art) coupling components in aligned but uncoupled and closed positions.
Figure 2:
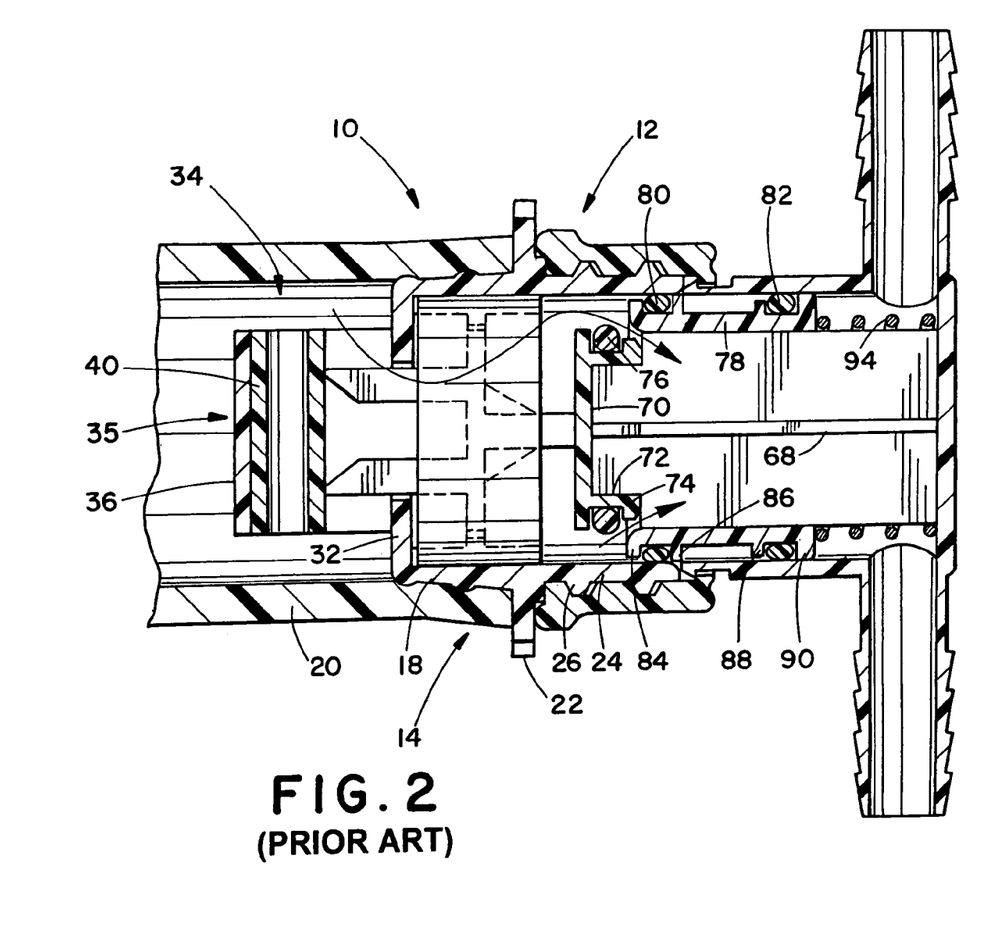
FIG. 2 is a view similar to FIG. 1 but showing the prior art components in a coupled position with their internal valves in the open position.

A known valve assembly is illustrated in FIGS. 1–9. FIGS. 1 and 2 show the overall arrangement of a prior coupling assembly and comprising a first coupling component 10 adapted to join with and provide a mechanical and flow connection with a second coupling component 12. Each of the coupling components 10 and 12 are preferably injection molded from a suitable plastic to provide a relatively inexpensive coupling structure.

Figure 3:
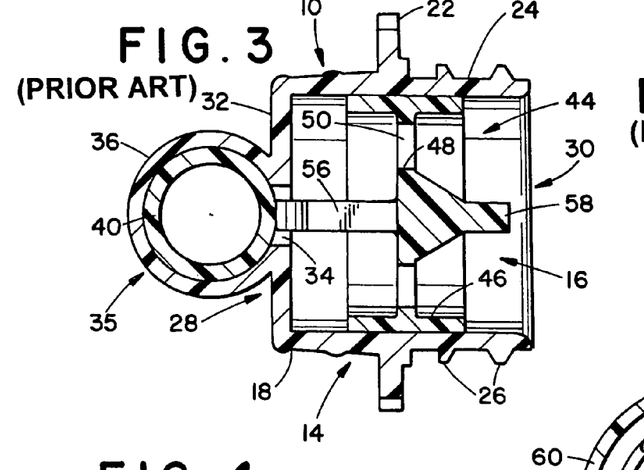
FIGS. 3 through 5 are cross-sectional views taken on lines 3—3, 4—4, and 5—5, respectively, of FIG. 1.

The prior first coupling component 10 can best be understood by reference to FIGS. 1 through 3 wherein it is shown as having a main cylindrical body portion 14 which defines a first or central flow passage 16 that extends axially through the body. A first cylindrical end portion 18 is sized so as to be capable of being closely and sealingly received within the outlet spout or fitment spout 20 of a conventional beverage storage bag as shown in FIG. 2. The body 14 further includes a radially extending flange portion 22 which limits the insertion of the body into the spout 20. Additionally, the cylindrical right-hand or outer end 24 of body 14 is provided with suitable external threads 26 which, as will subsequently be described, provide means for connecting the second coupling component 12 thereto.

The passageway 16 has an inlet end 28 and an outlet end 30 as referenced in FIG. 3. The inlet end 28 includes a wall portion 32 which extends radially inward and terminates in a vertically elongated elliptical inlet opening 34.

Associated with the inlet end 28 of the body 14 is a valve assembly 35. The valve assembly 35 comprises a tubular seal retaining member or body 36 which is integrally molded to the end wall 32 and which extends with its center axis perpendicular to the center axis of body 14. As illustrated, the tubular body 36 is preferably of cylindrical shape and defines a second flow passage 39. The tubular body 36 is open at its opposite ends as illustrated so the second flow passage 39 receives fluid flow from an associated spout of an associated container. As can be seen from FIGS. 2 and 3, the second flow passage 39 of the tubular member 36 communicates with the first flow passage 16 of body 14 through the inlet opening or port 34.

In order to provide a valving control of the opening 34 in this prior arrangement, there is a resilient tubular valve or seal member 40, operably positioned within the second flow passage 39 of the tubular member 36. The resilient tubular seal member 40 is formed of food-grade rubber or similar resilient elastomeric material, e.g., silicone, and is located in the tubular member 36 under substantial compressive force (owing to its dimensions and natural resiliency) so as to sealingly overlie and close off the inlet opening 34. While the seal member 40 is positioned as illustrated in FIGS. 1 and 3, the opening 34 is closed and flow cannot take place between the interior of the beverage bag nozzle and the first (central) flow passage 16. However, when the seal member 40 is deflected away from the inlet 34 as illustrated in FIGS. 2 and 3, flow can pass from the interior of the beverage bag to the flow passage 16 by way of the second flow passage 39 and inlet port 34.

Figure 6:
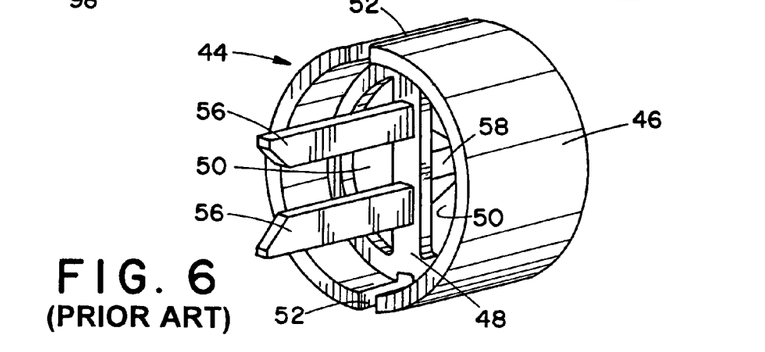
FIG. 6 is a pictorial view of a known operating slide member.

The means for selectively deflecting the tubular seal member 40 away from port opening 34 comprises a slide member 44 which is located within the first flow passage 16 and mounted for selective sliding movement therein between first and second operative positions. The actual preferred shape and configuration of the slide member 44 is best illustrated in FIG. 6. As shown therein, it comprises a central sleeve-like body 46 which has an outer diameter so as to be closely but slidably received within the interior of first passage 16. Located in the axial center of the sleeve 46 is a transversely extending wall 48 which includes a pair of spaced elongated openings 50 formed therethrough. The sleeve 46 is arranged so as to be guided within the first passageway 16 by a pair of inwardly extending diametrically opposed slots 52 which are sized to receive suitable guide ribs 54 (see FIG. 1) which extend inwardly from the interior of passageway 16. These ribs 54 and their cooperation with the slots 52 allow free axial sliding movement of member 46 while preventing unwanted rotary movement.

Extending from the left or inner side of the central wall 48 are a pair of fingers 56 which are sized and spaced so as to pass freely through the inlet port opening 34. Extending from the opposite side of the wall 48 is an operating stem or member 58. The operating member 58 provides means for causing the slide member to move from the first operative position illustrated in solid lines in FIG. 1 to a second operative position as illustrated in phantom lines in FIG. 1 that produces deformation and opening of the valve tube 40 when the components are in the coupled position of FIG. 2 as described in further detail below.

Figure 4:
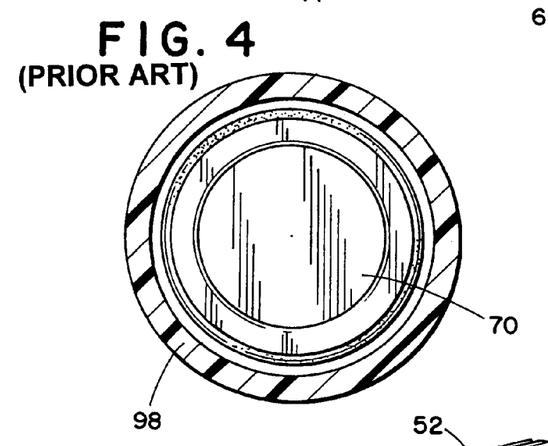
Figure 5:
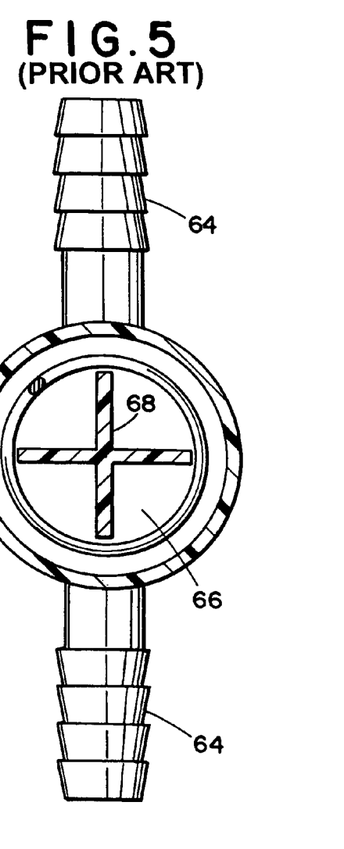

The actual operation and interrelation between the two components 10 and 12 in this prior arrangement will become better understood with a full appreciation of the construction and arrangement of component 12. As best seen in FIGS. 1, 4, and 5, the coupling component 12 generally comprises a main cylindrical body 60 having a third flow passage 62 which, in the illustrated embodiment, is defined by a cylindrical interior chamber. The coupling component also comprises a fluid outlet such as one or more outlet tubes 64 that are in fluid communication with the third flow passage 62. The outlet tubes 64 provide means for fluidic connection of the coupling component 12 to associated beverage dispensing lines connected with suitable dispensing taps, outlet nozzles, or the like. In the subject embodiment, the outlet tubes 64 are illustrated as arranged for connection with conventional hose lines through the use of standard barb exteriors. Of course, other types of outlet connections could be provided on the tubes 64. Moreover, the coupling component 12 could be provided with one or any number of such outlet tubes 64.

Formed integrally with the cylindrical body 60 and extending laterally from the end wall 66 is a central support member 68 which, as best seen in FIG. 5, has an X-shaped cross-inwardly section. Additionally, the support member 68 is axially located within the third flow passage 62 and extends to the left (as viewed in FIG. 1) out of the body 60.

At the left-hand or inner end (as viewed in FIGS. 1 and 2) of the central support member 68, there is permanently affixed thereto a liquid impervious disk member 70 having a circular configuration and an axially extending sleeve portion 72 which terminates in a radially outwardly extending flange 74. A suitable O-ring member 76 is positioned in the radially outwardly extending groove defined by the peripheral portion of disk 70 and the flange 74.

Carried on the support member 68 for axial sliding movement thereon is a valve sleeve member 78 which has a cylindrical configuration and an inner diameter which is closely but slidably received on the outer ends of the X-shaped cross-section of the support member 68. O-rings 80, 82 are carried at the opposite ends of the sleeve as shown. The O-rings are maintained in their desired position by spaced sets of radially extending flanges 84 and 86 and 88, 90. The flanges 88, 90 have an outer diameter which is only slightly less than the inner diameter of the chamber 62. Flange 86, however, extends radially outward a distance slightly greater than the interior diameter of third flow passage 62 and, for reasons which will subsequently be described, is slightly larger in diameter than the interior diameter of first flow passageway 16 defined in coupling component 10.

As can be seen from FIGS. 1 and 2, a spring member 94 is arranged to maintain the sleeve member biased inwardly or to the left, i.e., toward the disk member 70. The maximum outward movement of the sleeve member 78 toward the disk member 70 is limited by engagement between the outer radial periphery of disk member 70 and the end of sleeve 78 as illustrated in FIG. 1.

When sleeve 78 is in the FIG. 1 position, a seal is present between the disk member 70 and the interior of the sleeve 78 by virtue of the O-ring 76. Additionally, the O-ring 82 is sealed with the interior of the cylindrical body 60. In this position, as illustrated in FIG. 1, flow cannot enter the third flow passage 62. Only when the components 10 and 12 are properly engaged and interrelated, however, is the sleeve valve 78 is moved to the right against the bias of spring 94 out of its normally closed condition so that flow can take place about the disk member 70 from the first passage 16 into the third passage 62 as shown by the arrow A1 in FIG. 2. Coupling engagement and joining of the components 10, 12 can be provided by any suitable means such as a friction fit, snap-fit, threaded connection, adhesive connection or the like. In the illustrated example, coupling of the components 10, 12 is provided by a cylindrical female nut member 98 which is suitably received about the exterior of the body 60. As illustrated, the nut member 98 is internally threaded as shown at 100 and sized so as to mate with the external threads 26 on the end 24 of first component 10. A radially inward extending flange portion 102 is fitted within a groove 104 on body 60. This relationship retains the nut member on the body 60 while allowing it to be rotatable relative thereto.

To join the coupling components 10 and 12, they are moved to the aligned position shown in FIG. 1 and then brought axially together and the nut member 98 tightened onto the threaded exterior 26 of member 10. As the tightening takes place, the disk member 70 engages the end of operating stem 58 and causes the slide member 44 to be moved inwardly or to the left (toward the seal member 40) from its first operative position to its second operative position with the fingers 56 entering through the port 44 and deflecting the seal member 40 to the left to the dotted line position shown in FIGS. 1 and 3. Simultaneously with this movement, the right-hand end of the component 10 engages with the O-ring 80 and the flange 86. This creates a seal between the exterior of sleeve 78 and the interior of coupling 10 portion 24. It also causes the sleeve 78 to be slid to the right against the bias of spring 94 to open the flow passage about disk 70. This final connected relationship is shown in FIG. 2.

Figure 7:
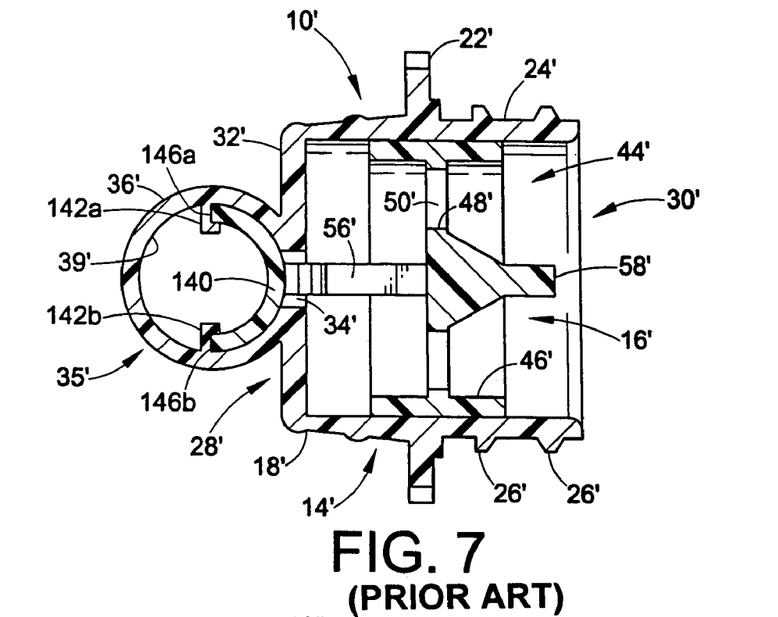
FIG. 7 illustrates a first component of an adapter coupling formed in accordance with another known design.
Figure 8:
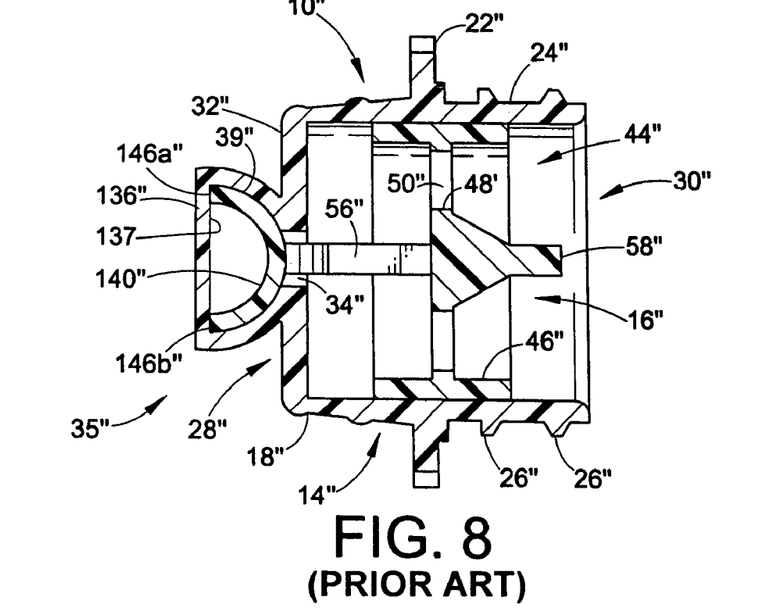
FIG. 8 is a view similar to FIG. 7 but showing still another alternative known design of a first component of an adapter coupling.

A coupling formed in accordance with another known design comprises the second component 12 as described above and a first component 10' as described below and as illustrated in FIG. 7 or 8. Except as shown and described, the first coupling component 10' is identical to the first coupling component 10 and, thus, like reference numerals including a prime (') suffix are employed to identify like components. New components are identified with new reference numerals. In place of the tubular seal 40, the component 10' comprises a partially tubular or arcuate seal member 140 that is otherwise identical to the seal 40. In its preferred conformation, the seal member 140 is partially tubular, e.g., semi-tubular or half-tubular as illustrated. The tubular portion 36' in which the seal member 140 is received defines the third flow passage 39' and first and second radially inwardly projecting shoulders 142a, 142b that are adapted to receive and retain respective first and second legs or terminal ends or feet 146a, 146b of the seal member 140. The shoulders 142a, 142b and seal 140, itself, are dimensioned so that the seal 140 is compressed when operably positioned in the tubular member 36' as shown so that it sealingly engages the inlet opening 34' with sufficient compressive force to prevent leakage. The seal member 140 utilizes significantly less material than the seal 40. Thus, the seal 140 is less expensive and its use results in lower cost of the component 10' relative to the component 10.

Those of ordinary skill in the art will recognize that the member 36' need not be tubular and can have a different cross-sectional shape as desired as long as the seal member 140 can be accommodated properly so that it sealingly engages the inlet opening 34' as described. FIG. 8 illustrates a first coupling component 10" formed in accordance with another known design. Except as otherwise shown and/or described, the coupling 10" is identical to the coupling 10'. Therefore, like components of the coupling 10" relative to the coupling 10' are identified with like reference numerals including a double-primed (") suffix.

As shown in FIG. 8, the first component 10" includes a semi-cylindrical valve housing member 136" in which the arcuate seal 140" is operably positioned. The valve housing member defines the third flow passage 39" in which the seal 140" is positioned. The legs or terminal ends 146a, 146b of the seal are seated against a transverse end wall 137 of the housing member 136".

Figure 9:
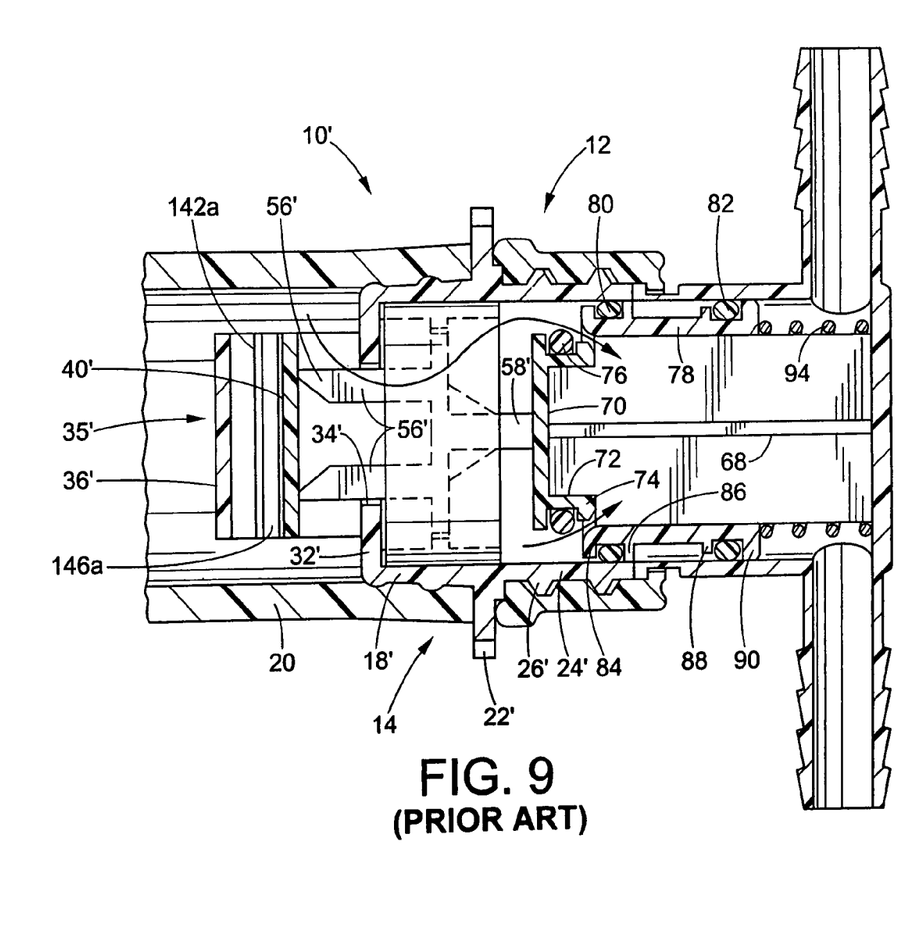
FIG. 9 shows another known adapter coupling including the first component illustrated in FIG. 7.

FIG. 9 shows a coupling formed including the first component 10' coupled to the second component 12. Those of ordinary skill in the art will recognize that a such a coupling comprises either the first valve component 10' or the first valve component 10" coupled to the second valve component 12.

A need has been identified for an effective and inexpensive valve for use in dispensing viscous or non-viscous liquid (e.g., beverages, liquid soap, etc.) from a bulk container such as a bag-in-box container or the like directly into a smaller receptacle container. Furthermore, it has been deemed desirable to provide such a valve that is simple to operate and that is usable in an automated or manual operation wherein the process of mating the valve spout outlet with the fill opening of the receptacle container and the process of actuating the valve to dispense with the material from the associated bulk container are integrated into a single linear motion, wherein the valve is opened by inward pressure exerted by the receptacle container against the spout outlet of the valve. The above-described prior-art valve has not been found suitable for such an application, and a new and improved dispensing valve is therefore described herein.

SUMMARY

A dispensing valve comprises a first component comprising a body adapted to be secured in fluid communication to a fitment of a liquid container. The body defines a first flow passage that extends therethrough. The first flow passage has an inlet. A valve assembly is connected to said body. The valve assembly comprises: (i) a seal retaining body defining a second flow passage that communicates with said inlet of said first flow passage; and, (ii) a resilient seal member located in said second flow passage and resiliently urged into sealing engagement with the inlet to block fluid flow from the second flow passage into the first flow passage via the inlet. The dispensing valve further comprises an outlet spout that defines a bore that extends from and through a first end to and through a second end. The first end of the spout is slidably coupled to the first component, and the spout is selectively moveable slidably inward toward the first component to a position where the seal member is moved resiliently away from the inlet to allow fluid flow from the second flow passage to the first flow passage through the inlet.

BRIEF DESCRIPTION OF THE DRAWINGS

The invention comprises various components and arrangements of components, preferred embodiments of which are illustrated in the accompanying drawings that form a part hereof and wherein.

DETAILED DESCRIPTION OF THE PREFERRED EMBODIMENTS

Figure 10:
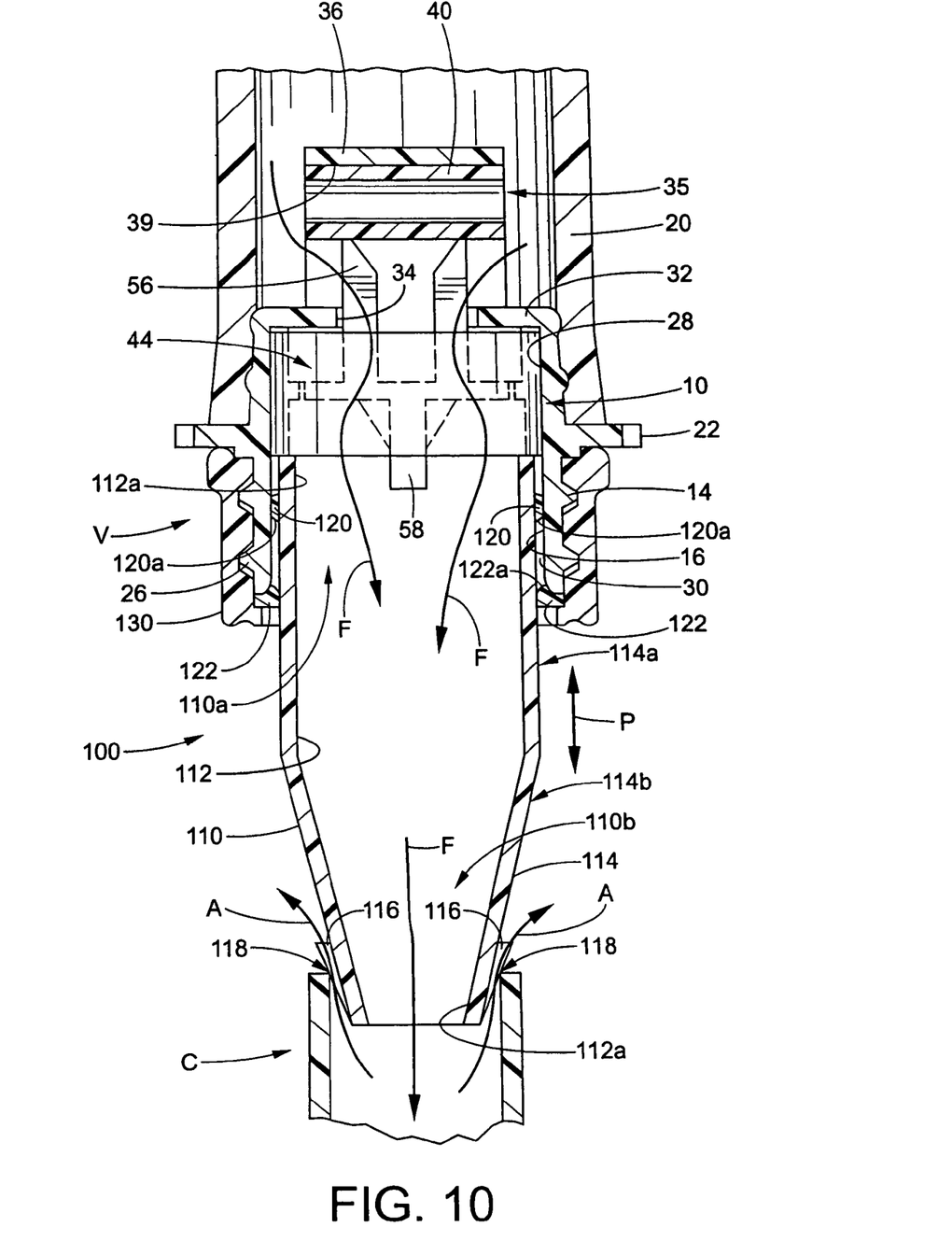
FIG. 10 illustrates a dispenser valve with push-to-open spout formed in accordance with the present invention in an opened configuration; and, FIG. 11 shows an alternative spout assembly formed in accordance with the present invention.

FIG. 10 illustrates a dispensing valve V formed in accordance with the present invention. The dispensing valve V comprises the first component 10 (or optionally 10', 10") as described above with reference to FIGS. 1–9 and further comprises a spout assembly 100 operably coupled to the first component and providing a push-to-open capability. The first component 10 is positioned in an outlet passage/outlet fitment 20 of an associated liquid-holding container from which liquid is to be dispensed to fill an associated container C.

The spout assembly 100 of dispensing valve V comprises an elongated spout member 110 that defines a through-bore 112 that extends from an inlet 112a located at a first or inner end 110a of member 110 to an outlet 112b located at a second or outer end 110b of member 110. The inner end 110a is preferably cylindrical and defines a cylindrical outer surface 114a. The outer end 110b is preferably frusto-conical so as to comprise a converging tapered outer surface 114b. The spout member 110 comprises vent means such as the plurality of ribs 116 that project radially outward from the outer surface 114b adjacent outer end 110b. The ribs 116 are circumferentially spaced about the outer surface 114b relative to each other so that when the outer end 110b of the spout member 110 is inserted into an associated container C to be filled with a liquid, a plurality of vent passages 118 are defined between the associated container C and the outer surface 114b between the ribs 116 to allow for venting of air as indicated by arrows A.

The inner end 110a of spout member 110 is received within the flow passage 16 of the first component 10. A first collet member 120 is closely and frictionally carried on the outer surface 114a and comprises a tapered bearing surface 120a. The spout member 110, including the first collet member frictionally engaged therewith, is adapted for axial sliding movement in the flow passage 16 as indicated by the double-ended arrow P.

To prevent separation of the spout member 110 from the first component, a second collet member 122 is provided. The second collet member 122 comprises a bearing surface 122a that mates with the bearing surface 120a of the first collet 120 upon attempted withdrawal of spout member 110 from passage 16. The second collet 122 is positioned to be concentric with the end 30 of the first component and is held in a fixed position by a nut 130 that is threadably connected to the first component 10 via threads 26. Of course, other suitable and convenient means can be employed to slidably yet securely retain spout member 110 in the flow passage 16, and the invention is not intended to be limited to the illustrated embodiment.

In use, the spout member 110 is manually pushed inward as shown in FIG. 10 so that the inner end 110a moves the slide member 44 inward so that the seal member 40 (or 140, 140" with respect to the versions of first component 10', 10" shown in FIGS. 7 and 8) is unseated to allow flow from outlet 20 of the associated liquid-holding container or other source into passage 16, into bore 112 of spout member 110 via inlet 112a and into the associated container C via outlet 112a as indicated by the arrows F. When the manual inwardly directed force on the spout member 110 is removed or subsides sufficiently, the seal member 40 resiliently moves into a fluid-tight seating with the port or opening 34 to block further fluid flow. As the seal member 40 moves resiliently into sealing engagement with the opening 34, the slide member 44 and spout member 110 are urged by the seal member 40 and gravity outwardly so that collet 120 moves toward (and typically into engagement with) collet 122. As noted above, the bearing faces 120a, 122a of the first and second collets 120, 122 engage to prevent the spout member 110 from being completely withdrawn from the passage 16. Of course, upon attempted withdrawal of the spout member 110, the first collet is radially constricted about and grips the outer surface 114a owing to the engagement of the mating bearing surface 120a, 122a.

The spout member 110 is dimensioned and conformed so that it mates with the slide member 44 in a manner so that liquid flows from opening 34 into inlet 112a of the bore 112 defined by the spout member 110. Of course, seals and other means are provided as needed to prevent/inhibit undesired liquid flow between the spout member 110 and body 14 of first portion 10. Also, if desired, the spout member 110 can be connected to or otherwise integrated into the slide member 44 or, stated another way, the separate slide member 44 can be eliminated and the spout 110 can comprise the fingers 56 or other means to engage and control the position of the seal 40 based upon the axial location of the spout member 110 in the passage 16.

Figure 11:
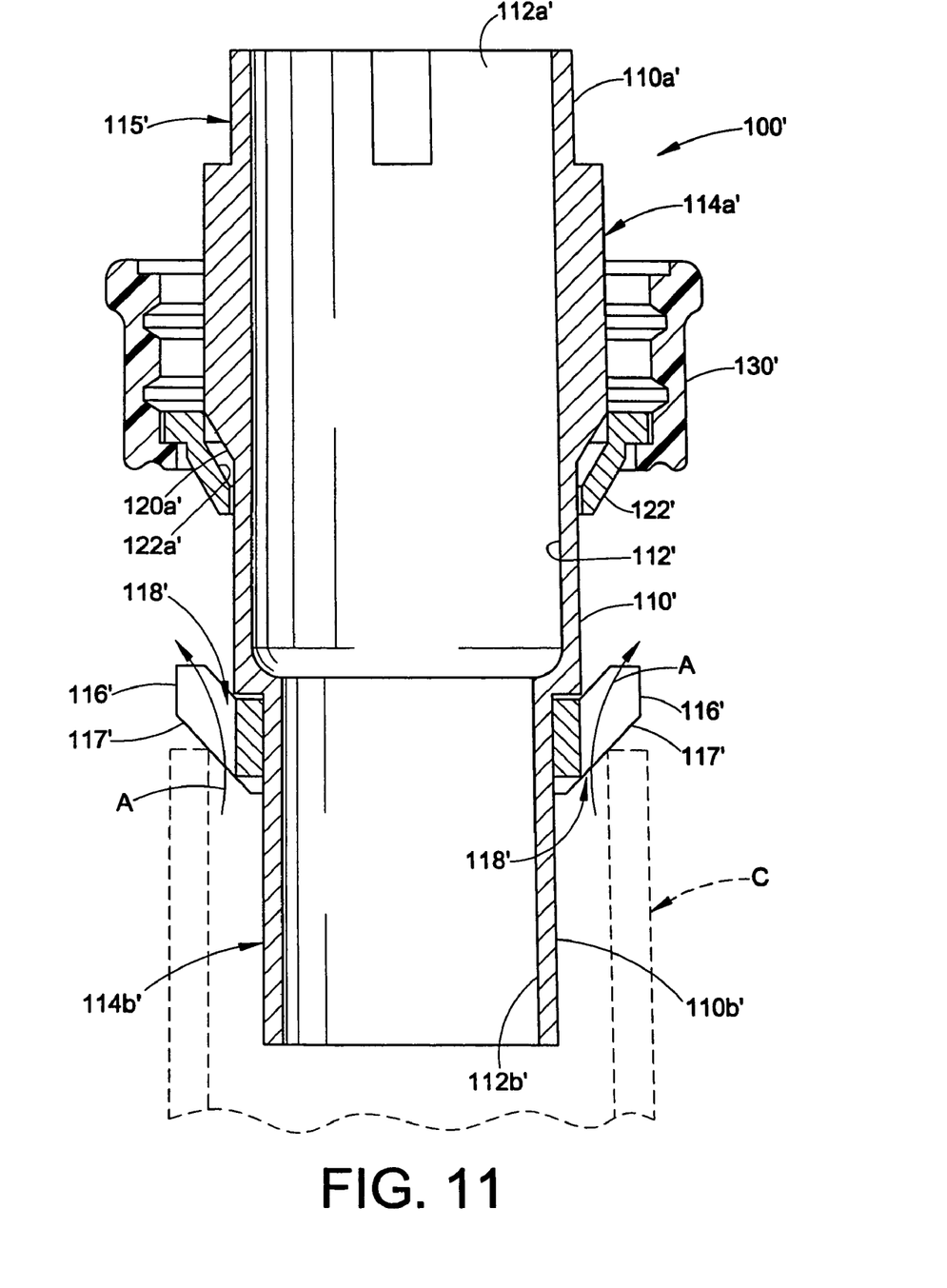

FIG. 11 illustrates an alternative spout assembly 100' formed in accordance with the present invention. Like components relative to the spout assembly 100 shown in FIG. 10 are identified with like reference characters that include a primed (') suffix. Except as otherwise shown and/or described herein, the spout assembly 100' is formed and functions according to the above description of the spout assembly 100. The spout assembly 100' comprises an elongated spout member 110' that defines a through-bore 112' that extends from an inlet 112a' located at a first or inner end 110a' of member 110' to an outlet 112b' located at a second or outer end 110b' of member 110'. The inner end 110a' is preferably cylindrical and defines a cylindrical outer surface 114a' and a cylindrical reduced-diameter portion 115'. The outer end 110b' preferably comprises a cylindrical outer surface 114b'.

The spout member 110' comprises vent means such as the plurality of ribs 116' that project radially outward from the outer surface 114b' adjacent outer end 110b'. The ribs 116' comprise spoke-like members that are circumferentially spaced about the outer surface 114b' relative to each other so that when the outer end 110b' of the spout member 110' is inserted into an associated container C' to be filled with a liquid, a plurality of vent passages 118' are defined between the associated container C' and the outer surface 114b' between the ribs 116' to allow for venting of air when liquid flows into container C as indicated by arrows A. The ribs 116' each comprise a tapered leading edge 117', and the ribs 116' are arranged so that the tapered leading edges 117' cooperate to define a frusto-conical skeleton or framework that diverges moving axially away from the outer end 110b' so that the vent means provided by ribs 116' is self-sizing as it is inserted into a mouth of an associated container C to be filled.

The inner end 110a' of spout member 110' is received within the flow passage 16' of the first component 10 and the reduced-diameter portion 115' is received partially within and mates with the slide member 44. The spout member 110' is adapted for axial sliding movement in the flow passage 16.

To prevent separation of the spout member 110 from the first component, the spout member 110' includes or defines a tapered shoulder 120a'. The tapered shoulder 120a' engages the bearing surface 122a' of the second collet member 122' upon attempted withdrawal of spout member 110' from passage 16'. As described above in relation to FIG. 10, the second collet 122' is positioned to be concentric with the end 30 of the first component 10 and is held in a fixed position by a nut 130' that is threadably connected to the first component 10 via threads 26.

The invention has been described with reference to the preferred embodiments. Modifications will occur to others upon a reading this specification. It is intended that the claims be construed to encompass all such modifications.

What is claimed is:

1. A dispensing valve comprising:
   a first component comprising a body adapted to be secured in fluid communication to a fitment of a liquid container, said body defining a first flow passage that extends therethrough, said first flow passage having an inlet;
   a valve assembly connected to said body, said valve assembly comprising: (i) a seal retaining body defining a second flow passage that communicates with said inlet of said first flow passage; (ii) a resilient seal member located in said second flow passage and resiliently urged into sealing engagement with said inlet to block fluid flow from said second flow passage into said first flow passage via said inlet;
   an outlet spout defining a bore that extends from and through a first end to and through a second end, said first end of said spout slidably coupled to said first component, said spout selectively moveable slidably inward toward said first component to a position where said seal member is moved resiliently away from said inlet to allow fluid flow from said second flow passage to said first flow passage through said inlet.

2. The dispensing valve as set forth in claim 1, wherein said outlet spout comprises vent means located adjacent said second end.

3. The dispensing valve as set forth in claim 2, wherein said vent means comprise a plurality of ribs that define a plurality of vent passages.

4. The dispensing valve as set forth in claim 1, further comprising:
   a slide member positioned in said first flow passage and adapted for sliding movement between first and second operative positions, wherein said slide engages and moves said seal away from said inlet of said first flow passage when moved to its second operative position, and wherein said slide is moved from its first operative position to its second operative position in response to said inward movement of said spout relative to said first component.

5. The dispensing valve as set forth in claim 4, wherein said slide comprises a portion that projects outwardly therefrom into said inlet.

6. The dispensing valve as set forth in claim 5, wherein said portion of said slide that projects outwardly therefrom into said inlet comprises a pair of fingers.

7. The dispensing valve as set forth in claim 6, wherein said outlet spout comprises vent means for facilitating exhaustion of air from a receptacle container mated with said second end of said outlet spout.

8. The dispensing valve as set forth in claim 7, wherein said vent means comprises a plurality of ribs that define a plurality of air-flow vent passages.

9. The dispensing valve as set forth in claim 1, wherein said second flow passage comprises a cylindrical flow passage and said resilient seal member comprises a cylindrical body of resilient polymeric material tightly fitted into said cylindrical flow passage.

10. The dispensing valve as set forth in claim 1, wherein said second flow passage comprises an arcuate wall and wherein said resilient seal member comprises an arcuate body of resilient polymeric material tightly fitted into said second flow passage in abutment with said arcuate wall.

11. A container comprising:
    an outlet fitment; and,
    a dispensing valve for selectively dispensing liquid from the container through said outlet fitment, said dispensing valve comprising:
    a first component comprising a body adapted to be secured in fluid communication to said outlet fitment of a liquid container, said body defining a first flow passage that extends therethrough, said first flow passage having an inlet, wherein at least an inner portion of said first component is located in said outlet fitment;

a valve assembly connected to said inner portion of said body, said valve assembly comprising: (i) a seal retaining body defining a second flow passage that communicates with said inlet of said first flow passage; (ii) a resilient seal member located in said second flow passage and resiliently urged into sealing engagement with said inlet to block fluid flow from said second flow passage into said first flow passage via said inlet;

an outlet spout defining a bore that extends through first and second opposite ends thereof, said first end of said spout slidably coupled to said first component, said spout selectively moveable slidably inward toward said first component to a position where said seal member is moved resiliently away from said inlet to allow fluid flow from said second flow passage to said first flow passage through said inlet.

* * * * *